Feb. 1, 1927.
F. H. CROCKARD
GAS SEAL
Filed Jan. 30, 1926
1,615,933
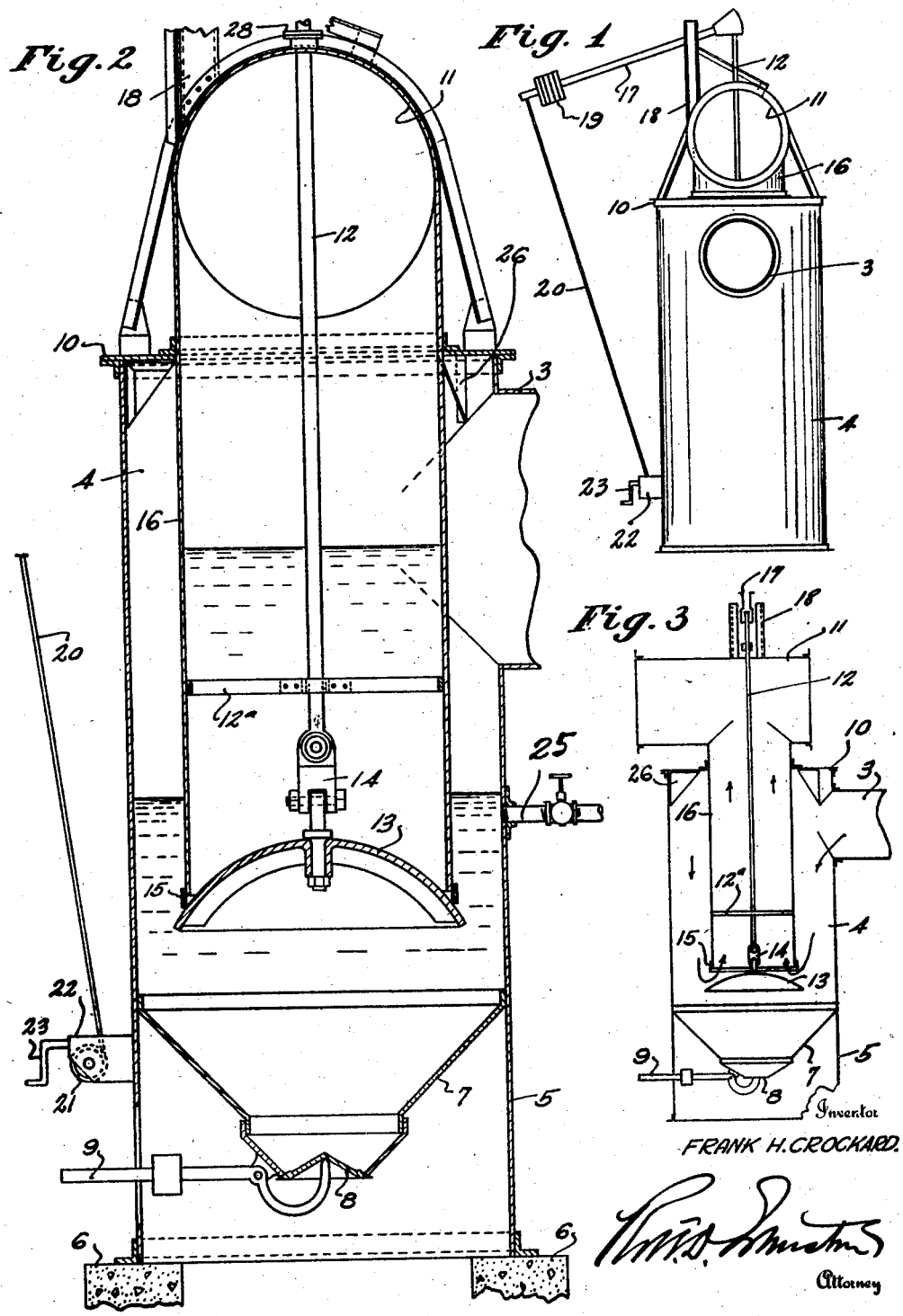
Inventor
FRANK H. CROCKARD.
Attorney Patented Feb. 1, 1927.

1,615,933

UNITED STATES PATENT OFFICE.

FRANK HEARNE CROCKARD, OF BIRMINGHAM, ALABAMA.

GAS SEAL.

Application filed January 30, 1926. Serial No. 84,989.

My invention relates to gas seals, and has for its chief object to design a seal which will be perfect against the leakage of gas under ordinary conditions and which will resist and seal against a sudden high increase in the pressure of gas.

Water seals have long been employed in gas mains and under ordinary operating conditions they provide a perfect seal against leakage of gas, but it is obviously impractical to design a liquid seal capable of withstanding abnormally high gas pressures which may occur for various reasons. Where such seals have heretofore been used, whenever abnormally high gas pressures have occurred the gas has blown through the sealing liquid.

Various types of mechanical gas seal valves have been designed, but they do not provide a perfect and reliable gas seal.

I have conceived that a gas seal can be designed which will have all the advantages of a liquid seal, without any of its disadvantages, due to the fact that I combine with a liquid seal a mechanical valve which will seat with the pressure below the sealing liquid level and thus will positively prevent the blowing through of the gases. In other words, by combining with a water seal chamber a submerged pressure seating mechanical valve, preferably of the bell type, I obtain a positive and always reliable gas seal.

It will be obvious that my mechanical valve will have long life as it is not essential that it shall provide a perfect gas seal itself, but that it shall serve to check the rush of gas under abnormal pressures sufficiently to prevent it from blowing out through the sealing fluid.

My invention, which is illustrated in its preferred embodiment only, will be hereinafter more particularly described and its distinctive features set forth in the appended claims.

In the drawings:—

Fig. 1 is a view in side elevation of my improved type of gas seal shown in elevation.

Fig. 2 is an enlarged cross-sectional view through the water seal chamber showing the submerged mechanical valve in closed position.

Fig. 3 is a diagrammatic view showing the sealing valve in open position, with the arrows indicating the path of the flowing gas.

Similar reference numerals refer to similar parts throughout the drawings.

In the drawings, 3 designates a conventional gas main which discharges gas into a gas seal chamber 4 within a metallic shell or jacket 5 that rests upon suitable foundations 6. The chamber 4 is closed below by a hopper 7 normally sealed by a counterweighted bell 8 operable by a handle 9 which projects without the shell 5. The shell 5 has mounted thereon a top 10 having a horizontal gas outlet connection 11 through which a vertical rod 12 passes and extends down axially through the shell 5. A gas sealing valve 13 is suspended from this rod 12 by a flexible connection 14 employing monel metal pin and bushings which will permit universal play. To guide and center the lower end of the rod 12, I provide a spider or cross guide 12ª in the discharge pipe near its lower end, and I provide a gland 28 where the rod passed through the top of the outlet 11 to prevent gas leakage. This valve 13 is adapted to co-act with a lip ring seat 15 at the bottom end of the gas discharge pipe 16, which pipe is disposed concentric with the shell 5 and alone has connection with the gas outlet 11 as the top 10 closes the annular chamber 4 overhead. The gases entering this chamber 4 through the inlet main 3, must first flow downwardly through chamber 4 between the shell and discharge pipe 16 and thence upwardly through the discharge pipe to reach the outlet 11. The operating rod 12 is connected to a lever 17 hinged on a bracket 18, above the gas seal top 10 and provided with a counterweight 19 and a cable connection 20 at its free end. The cable leads to a windlass 21 mounted on a steel support 22 and operable by a handle 23, which elements act to control the raising or lowering of the valve 13 to open or close the discharge pipe 16. Water is admitted to the gas seal chamber by a valve controlled inlet 25. Plate and angle gussets 26 are attached to the under pipe side of the top 10 and support the discharge pipe 16 and the gas outlet 11.

In practice, when it is desired to apply the seal, the valve 13 is left open until water, admitted by pipe 25, fills the chamber 4 and rises in the gas outlet 16 sufficiently to constitute a water seal. In Fig. 2 a difference in levels is indicated which, however, will vary with the gas pressure. Having established the water seal, the submerged valve 13 is raised until it engages its seal 15 and mechanically seals the intake end of pipe 16. Under such conditions both the fluid column in the discharge pipe 16 and the valve co-act to seal the discharge pipe against admission of gas, and since the valve 13 seats with the pressure, the mechanical seal will positively resist sudden high gas pressures, while any gas leakage past it will be withstood by the fluid column in the pipe.

Though I have described with great particularity the details of the embodiment of the invention herein shown, it is not to be construed that I am limited thereto, as changes in arrangements and substitution of equivalents may be made by those skilled in the art without departing from the invention as defined in the appended claims.

Having thus described my invention, what I claim as new and desire to secure by Letters Patent, is:—

1. In a gas seal, a chamber adapted to hold a body of sealing fluid and having a gas inlet and a gas discharge duct adapted to be sealed by said fluid, in combination with a valve adapted to seat with the pressure and to close the discharge duct below the level of a column of sealing fluid therein.

2. In a gas seal, a sealing chamber having a gas inlet, a gas discharge pipe for said chamber, means to provide a body of liquid in said chamber which will seal said gas discharge pipe, and a valve adapted to engage and seal the intake end of said discharge pipe.

3. A gas seal according to claim 2, in which the valve is of the bell type and is movable in the direction of the flow of gas into the discharge pipe.

4. A gas seal comprising a water sealing chamber having an upper gas inlet and a central gas discharge pipe, means to maintain a body of water in said chamber to seal the gas intake end of said discharge pipe, a valve and its seat disposed below the level of the sealing water, and means to move said valve to engage its submerged seat and provide a combined fluid and mechanical seal for said discharge pipe.

In testimony whereof I affix my signature.

FRANK HEARNE CROCKARD.